United States Patent
Gendraud (10) Patent No.: US 8,721,277 B2
(45) Date of Patent: May 13, 2014

(54) UNIT FOR LOCKING RING SECTORS ON A TURBOMACHINE CASING, COMPRISING RADIAL PASSAGES FOR GRIPPING IT

(75) Inventor: Alain Dominique Gendraud, Vernou la Celle sur Seine (FR)

(73) Assignee: SNECMA, Paris (FR)

( * ) Notice: Subject to any disclaimer, the term of this patent is extended or adjusted under 35 U.S.C. 154(b) by 680 days.

(21) Appl. No.: 12/990,913

(22) PCT Filed: May 14, 2009

(86) PCT No.: PCT/EP2009/055811
§ 371 (c)(1),
(2), (4) Date: Feb. 1, 2011

(87) PCT Pub. No.: WO2009/138443
PCT Pub. Date: Nov. 19, 2009

(65) Prior Publication Data
US 2011/0121150 A1 May 26, 2011

(30) Foreign Application Priority Data

May 16, 2008 (FR) .................................... 08 53182

(51) Int. Cl.
*F01D 9/04* (2006.01)
*F01D 25/28* (2006.01)
(52) U.S. Cl.
USPC .................................... 415/214.1; 29/889.22
(58) Field of Classification Search
CPC ....... F01D 25/24; F01D 25/246; F01D 25/28; F01D 11/005; F01D 2240/91; F01D 2260/39

USPC .......... 415/173.1, 173.2, 173.3, 209.2, 209.3, 415/213.1; 29/889.2
See application file for complete search history.

(56) References Cited

U.S. PATENT DOCUMENTS

| 5,197,853 A | * | 3/1993 | Creevy et al. ................. 415/115 |
| 5,848,854 A | * | 12/1998 | Brackett ....................... 403/327 |
| 5,970,716 A | * | 10/1999 | Forrester et al. ............... 60/746 |

(Continued)

FOREIGN PATENT DOCUMENTS

| EP | 0 967 364 | 12/1999 |
| EP | 1 455 055 | 9/2004 |
| FR | 2 887 920 | 1/2007 |
| GB | 1 139 295 | 1/1969 |

OTHER PUBLICATIONS

International Search Report issued Aug. 10, 2009 in PCT/EP09/055811 filed May 14, 2009.
U.S. Appl. No. 12/991,641, filed Nov. 16, 2010, Gendraud, et al.

*Primary Examiner* — Nathaniel Wiehe
*Assistant Examiner* — Wayne A Lambert
(74) *Attorney, Agent, or Firm* — Oblon, Spivak, McClelland, Maier & Neustadt, L.L.P.

(57) ABSTRACT

A unit locking a ring sector attachment device onto an aircraft turbomachine casing, the unit including two clamping arms connected to each other at their aft ends by a connecting arm extending approximately parallel to the general direction between the two clamping arms. The unit also includes a passage enabling gripping of the unit on each side of a fictitious median plane orthogonal to the circumferential direction, each passage being formed in the connecting arm, extending along a direction line approximately parallel to the direction between the arms.

16 Claims, 5 Drawing Sheets

(56) References Cited

U.S. PATENT DOCUMENTS

| | | |
|---|---|---|
| 6,200,091 B1 | 3/2001 | Bromann et al. |
| 6,412,149 B1 * | 7/2002 | Overberg ................. 24/455 |
| 6,435,820 B1 * | 8/2002 | Overberg ................. 415/138 |
| 6,575,697 B1 * | 6/2003 | Arilla et al. ................. 415/173.1 |
| 2004/0219009 A1 * | 11/2004 | Marchi et al. ................. 415/116 |
| 2009/0081037 A1 * | 3/2009 | Audeon et al. ............. 415/209.3 |
| 2009/0104026 A1 * | 4/2009 | Dakowski et al. ......... 415/173.1 |
| 2009/0123278 A1 * | 5/2009 | Audeon et al. ............. 415/214.1 |

* cited by examiner

UNIT FOR LOCKING RING SECTORS ON A TURBOMACHINE CASING, COMPRISING RADIAL PASSAGES FOR GRIPPING IT

TECHNICAL DOMAIN

This invention relates in general to a unit for locking a ring sector attachment device onto an aircraft turbomachine, for example a turbine casing.

The invention also relates to a turbomachine for an aircraft fitted with such locking units, this turbomachine possibly being in the form of a turboprop or a turbojet.

STATE OF PRIOR ART

Ring sectors fixed circumferentially on the casing around the mobile blades of the turbine of a turbojet and jointly forming a continuous cylindrical envelope delimiting the outside boundary of the gas path in the turbine, are known in prior art. The ring sectors are mounted on an internal casing of the turbine by means of casing elements called intermediate casing elements or spacers, onto which they are attached at their forward end and they are held in place at their aft end by C-shaped or horizontal U-shaped locking units. The aft ends of these locking units are axially/longitudinally engaged on circumferential rims of the aft ends of ring sectors and intermediate casing elements, to hold them radially in contact with each other.

This attachment of ring sectors onto intermediate elements of the turbine casing means that they can follow the thermal expansions and contractions of the turbine casing into which hot gases or cold gases are injected to control its thermal expansions and contractions so as to keep the smallest possible radial clearance between the internal surfaces of the ring sectors and the ends of the mobile blades of the turbine, and thus increase the turbine efficiency.

The locking units jointly form an annular locking device centred on the centre line of the turbomachine in a known manner, therefore each unit only forms one angular sector of this device. Each unit comprises two longitudinal tightening arms extending axially/longitudinally along the aft direction and connected at their aft ends by a connecting arm, while their forward ends will squeeze at least one ring sector in contact with at least one casing element, between them. The ring sector and casing element forced into contact with each other are designed to fit into the space formed between the two longitudinal arms and open longitudinally along the forward direction.

The elasticity and separation between the two longitudinal arms of the locking units are chosen such that the applied radial clamping is effective. In such cases it is extremely difficult to extract these locking units, for example when necessary during turbine maintenance operations, due to the high radial clamping force applied by the longitudinal arms on the circumferential rims. Consequently, in order to make the extraction, the operator usually needs to use an unsuitably shaped tool that might damage the locking units and surrounding elements. For example, this situation might arise when the operator attempts to slide a screwdriver between one of the longitudinal arms of the unit and the circumferential rim in contact with this arm. The screwdriver is then used as a lever arm and might damage both the longitudinal arm and the circumferential rim concerned, or even injure the operator.

Consequently, the design of existing locking units does not enable fast and easy extraction, and also generates serious risks of damaging clamping arms during this extraction.

SUMMARY OF THE INVENTION

Therefore, the purpose of the invention is to at least partially correct the disadvantages mentioned above for embodiments according to prior art.

To achieve this, the first purpose of the invention is a locking unit for a device designed to attach ring sectors onto an aircraft turbomachine casing, said unit extending along a circumferential direction between a first circumferential end and a second circumferential end, the cross section of said unit in a plane orthogonal to said circumferential direction containing two clamping arms connected to each other at their aft ends by a connecting arm extending approximately parallel to the general direction between the two clamping arms, the forward ends of the two clamping arms being designed to squeeze at least one ring sector into contact with at least one casing element, between them.

According to the invention, said unit is provided with a passage enabling gripping of said unit on each side of a fictitious median plane orthogonal to said circumferential direction, each passage being formed in said connecting arm and extending along a direction approximately parallel to said direction between the arms.

Thus, the unit according to the invention provides an innovative means of gripping it, designed to facilitate extraction after it has been put into place on the ring sectors, for example using an adapted tool.

The special positions of the passages at the connecting arm, namely at a distance from the forward ends of the clamping arms that squeeze the ring sectors into contact, means that they can easily cooperate with an extraction tool without any risk of adversely affecting the functions of this locking unit, therefore particularly due to the lack of direct contact between the tool and the above-mentioned ends. In other words, the fact that these passages are gripped with a tool does not create any direct mechanical force on the forward ends of the clamping arms that will therefore not be damaged by pressure applied by the tool, since the applied loads are essentially concentrated on the connecting arm that is offset in the aft direction from the sensitive zone.

Preferably, each direction line is a straight line, for example extending approximately along the radial direction and therefore orthogonal to said circumferential direction along which the locking unit extends. In other words, each straight line preferably passes through an axis of a turbine on which there are several of these units to force the ring sectors into contact with the casing elements. Obviously, the orientation of the direction lines of the passages could be different from the radial direction, for example it could be fixed such that the two direction lines are approximately parallel to each other.

Preferably, the two passages are arranged on or close to said first circumferential end and said second circumferential end. These ends are in the least highly stressed portions of the unit when the unit is in the ring sector clamping condition, such that the presence of passages at these locations only negligibly weakens the unit, and surrounding zones do not need to be oversized.

Preferably, each passage is approximately cylindrical with its axis corresponding to said direction line to facilitate manufacturing and cooperation with an extraction tool. As a result, each passage can indifferently be made as a through passage or a blind passage. For through passages, the tool can pass through the unit along the direction line, whereas for blind passages access is only authorised from the opening side of the blind passage.

According to one preferred embodiment, each passage is in the form of a groove along the direction line, such that the bottom of this groove is approximately parallel to the direction along the spacing. Preferably, each groove can be formed so as to open up in said circumferential direction. Alternatively, without going outside the scope of the invention, each groove could be formed so as to open up at the aft end along a longitudinal direction along which each of the two clamping arms extends.

Preferably, and especially in the case of grooves open in the circumferential direction, each groove is approximately semi-circular in shape when viewed from outside the unit and along said direction line.

Regardless of what case is envisaged, each groove forms at least one stop surface on said connecting arm, said stop surface being oriented approximately towards a space between the arms of the unit, defined between said clamping arms. Therefore, this stop surface can be used as a bearing surface for an extraction tool that can then be forced aftwards in the longitudinal direction, to provoke the required extraction. Naturally, the stop surface may be in different forms, for example curved in the preferred case of the semi-circular groove shape mentioned above, however the purpose is always to cooperate with this surface to form an aft stop in the longitudinal direction for a tool being forced in this direction after having been inserted in the associated passage.

According to another preferred embodiment of this invention, each passage has a closed delimitation line in a view taken from outside the unit along said direction line. This delimitation line may generally be an oblong or circular reamed type line.

The locking unit preferably forms an angular sector of an annular locking device, designed to be centred on the centre line of the turbine on which such a device is fitted.

Another purpose of the invention is a device for fixing ring sectors on an aircraft turbomachine casing comprising casing elements formed with first aft circumferential rims on which second aft circumferential rims of the ring sectors are applied, the attachment device also comprising a plurality of locking units like those described above engaged on said first and second circumferential rims to hold them in contact with each other. Therefore in this case, the first and second circumferential rims extending aftwards in the longitudinal direction penetrate through the forward opening of the units defined between the clamping arms, to be held radially in contact with each other.

Another purpose of the invention is a turbine in an aircraft turbomachine comprising a ring sectors attachment device like that described above, and/or at least one locking unit like that described above. Alternatively, without going outside the scope of this invention, it could be a turbomachine compressor.

Finally, another purpose of the invention is an aircraft turbomachine comprising a turbine like that described above, and/or a ring sectors attachment device like that described above, and/or at least one locking unit like that described above, this turbomachine indifferently being a turbojet or a turboprop.

Other advantages and characteristics of the invention will become clear after reading the detailed non-limitative description given below.

BRIEF DESCRIPTION OF THE DRAWINGS

This description will be made with reference to the appended drawings among which.

DETAILED DESCRIPTION OF PREFERRED EMBODIMENTS

Figure 1:
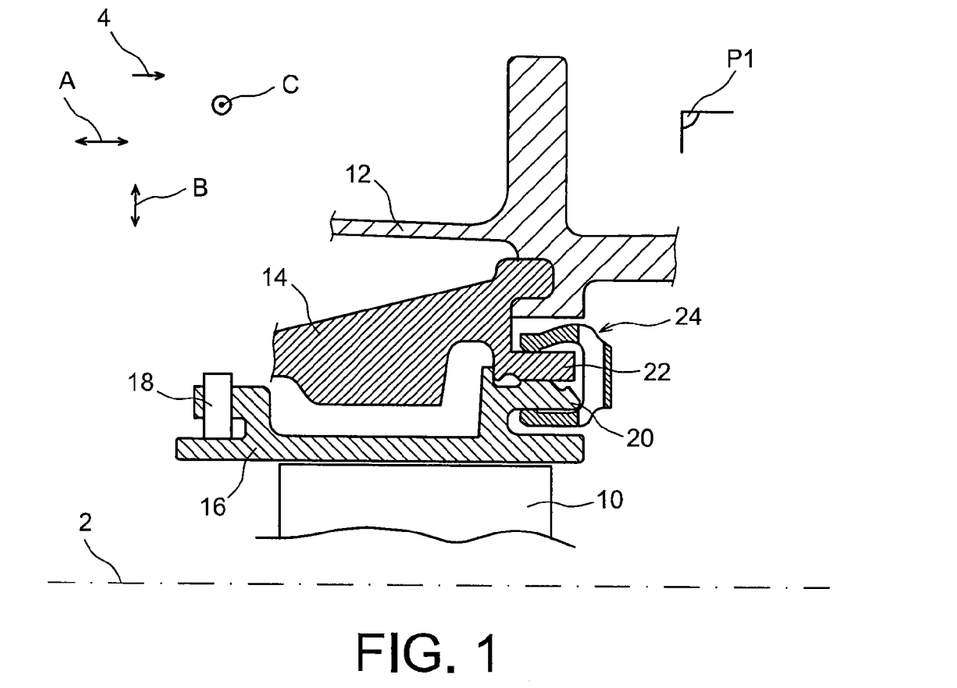
FIG. 1 shows a partial longitudinal sectional view of a device for the attachment of ring sectors onto a turbine casing of an aircraft turbomachine according to a preferred embodiment of this invention, this view also corresponding to a sectional view taken along plane P1 in FIG. 3, orthogonal to the circumferential direction and passing through one of the passages through which the unit can be gripped.
Figure 2:
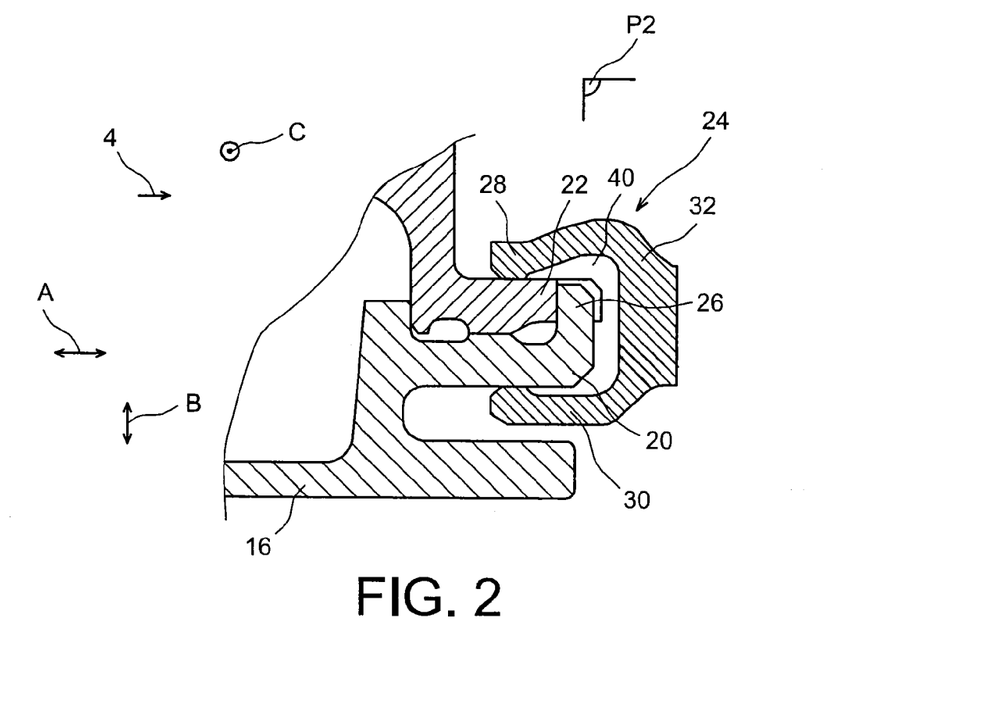
FIG. 2 shows a partial and enlarged view similar to that shown in FIG. 1, this view also corresponding to a sectional view along plane P2 in FIG. 3, forming a fictitious median plane orthogonal to the circumferential direction.

FIGS. 1 and 2 show an overview of a device for the attachment of ring sectors onto a turbine casing of an aircraft turbomachine according to one preferred embodiment of this invention.

On the figures, direction A corresponds to the longitudinal or axial direction parallel to the longitudinal axis 2 of the turbine and the turbomachine. Direction B corresponds to the radial direction of the turbine, and direction C to the circumferential direction. The arrow 4 also diagrammatically shows the main gas flow direction within the turbomachine, parallel to direction A, the terms <<forward>>, <<upstream>>, <<aft>>, <<downstream>> used in the remainder of this description being used relative to a forward direction of movement of the aircraft under the thrust of the turbomachine, this forward direction of movement being in the direction opposite to the arrow 4.

Reference 10 in FIG. 1 denotes the mobile blades of a high pressure turbine stage of a turbojet that rotate in a turbine casing 12 inside which casing elements 14 called spacers or intermediate casing elements are fixed. The elements 14 support ring sectors 16 fixed circumferentially around the rotation axis 2 of the turbine along direction C, the internal surfaces of these ring sectors forming a continuous cylindrical surface that delimits the outside of a gas flow path passing inside the turbine.

The ring sectors 16 extend around the turbine axis along direction C covering an angle from about 10 to 20°, and there may for example be about 30 of them.

The upstream end or the forward end of each ring sector 16 comprises a cylindrical-shaped circumferential rim 18 through which it is attached or fixed to a spacer 14, and it also comprises a cylindrical portion of a circumferential rim 20 that is applied onto a cylindrical portion of a circumferential rim 22 corresponding to the spacer 14. In the following, the circumferential rim 22 is called the first circumferential rim and the circumferential rim 20 is called the second circumferential rim.

The two circumferential rims 20 and 22 extending along direction A are held in contact with each other along direction B in which they are superposed by a C or horizontal U-shaped locking unit that is engaged through the aft part onto the circumferential rims 20 and 22, holding them radially clamped onto each other.

The locking units 24 jointly form an annular locking device centered on the axis 2, forming an integral part of the ring sectors attachment device. Thus, each device 24 is in the form of an angular sector of the annular locking device, for example extending over about 10 to 20° along direction C. They are made adjacent to each other along direction C to form a complete and preferably continuous ring, for example about thirty of them may be centred on the axis 2.

Note in this respect that if the angular extent of the units 24 around the turbine axis 2 may be of the same order of magnitude as the angular extent of the ring sectors 16, this extent could also be larger without going outside the scope of the invention. Thus, depending on the case, one locking unit 24 could be provided for each ring sector 16 or for several ring sectors 16.

The ring sectors 16, the spacers 14 and the locking units 24 are metallic, or made of a metal matrix composite MMC or other materials and the locking units 24 are fitted elastically squeezed onto the circumferential rims 20 and 22 to squeeze them in contact with each other with a certain prestress along the radial direction B as will be described below.

As shown diagrammatically in FIG. 2, the aft end of the second circumferential rim 20 of the ring sector 16 terminates in radial teeth 26 oriented outwards, and engaged in corresponding notches in the first circumferential rim 22 of the spacer 14, so as to fix each ring sector 16 in rotation about axis 2 of the turbine on a spacer 14.

In general, as seen in a section in a plane orthogonal to direction C as shown in FIG. 2, each locking unit 24 comprises two clamping arms 28 and 30, called the radially outer and radially inner longitudinal arms respectively, that are rigidly connected to each other at their aft end through a connecting arm 32, and the forward ends of which are applied onto the outer cylindrical face of the first circumferential rim 22 of the spacer 14 and onto the inner cylindrical face of the second circumferential rim 20 of the ring sector 16, respectively. Globally, the circumferential arms 28, 30 extend longitudinally along direction A at a spacing from each other along a general spacing direction, in this case preferably along the radial direction B. The circumferential arm 32 extends approximately along this spacing direction, namely along the radial direction B, to connect the two aft ends of the arms 28, 30. Therefore, these latter two arms jointly form a space between arms 40 open forwards along direction A through which the rims 20, can pass, and closed at its aft end along this direction A by the connecting arm 32.

Figure 3:
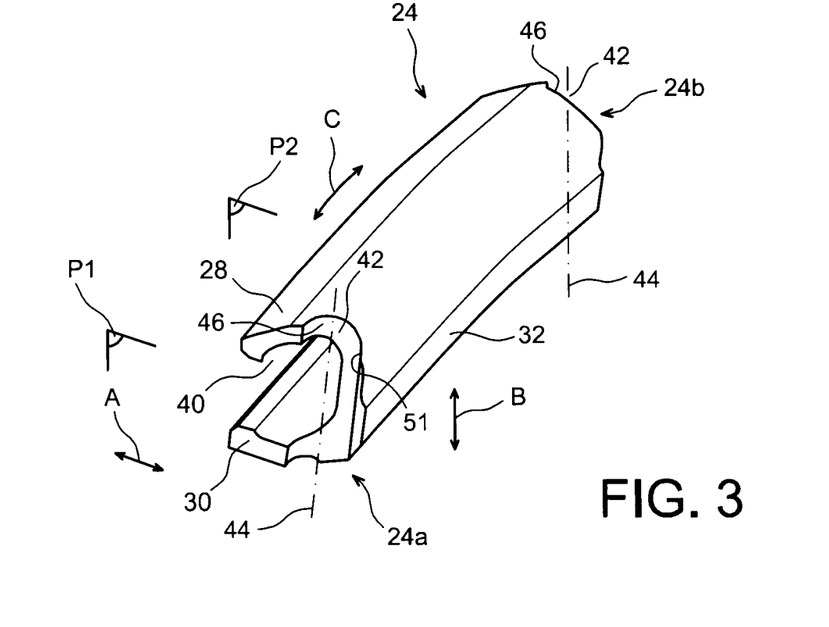
FIG. 3 shows a perspective view of a locking unit forming part of the ring sectors attachment device shown in FIGS. 1 and 2.

Although FIG. 2 shows that in a section orthogonal to direction C, the unit 24 is in the form of a C or a horizontal U, it must be understood that the unit extends with the same shape over a given angular sector along direction C, between a first circumferential end 24a and a second circumferential end 24b as shown in FIG. 3.

More specifically with reference to this figure, one of the special features of this invention lies in the presence of means preferably at or close to the circumferential ends 24a, 24b that enable gripping of the locking unit 24, globally arranged towards its aft end, particularly on the connecting arm 32.

These means are in the form of two passages, each in the form of a groove, located on each side of plane P2 forming a fictitious median plane orthogonal to direction C. More precisely and as mentioned above, the two grooves 42 are arranged at the ends 24a, 24b respectively and are specific in that each extends along a straight direction line 44, preferably along a radial direction parallel to the arm 32. Note that since the two radial straight lines 44 are at a circumferential spacing from each other, they are not really parallel to each other, although such a configuration could be envisaged.

Figure 4:
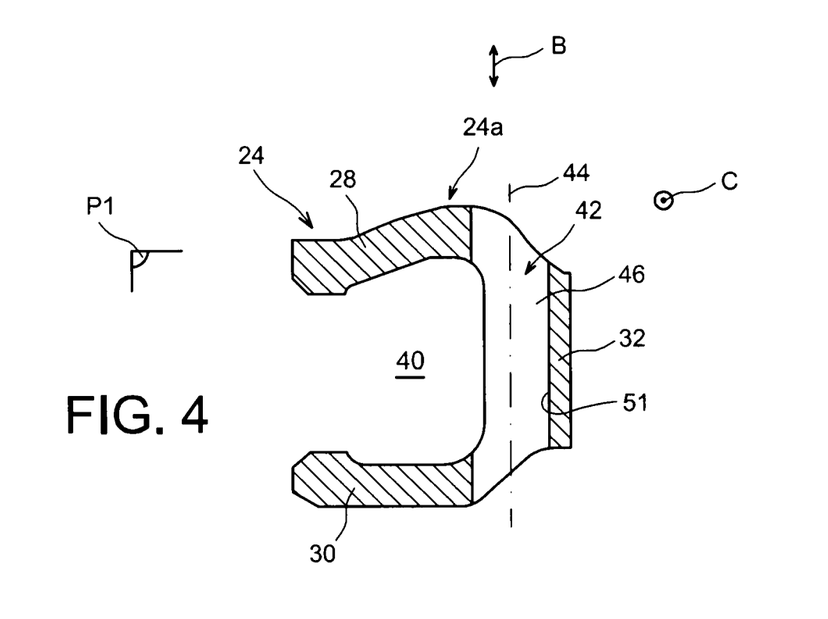
FIG. 4 shows an enlarged view of the locking unit shown in FIG. 1.
Figure 5:
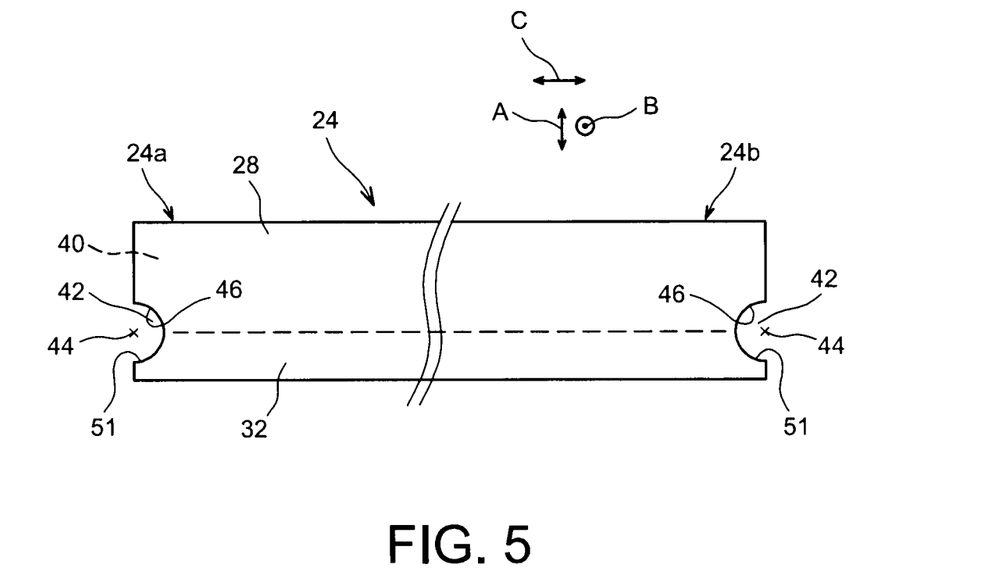
FIG. 5 represents the unit shown in FIGS. 3 and 4, the left part showing a view along the direction line of the passage formed in this part of the unit, and the right part showing a view along the direction line of the other passage formed in this part of the unit.

FIGS. 3 to 5 show that each groove 42 extends cylindrically along its straight direction line 44, being formed at least partly on the connecting arm through which it passes preferably entirely along direction B. In the preferred embodiment shown, each groove 42 is formed not only on arm 32, but also through an aft part of each of the two clamping arms 28, 30 while remaining at a distance from their forward contact ends. Nevertheless, each groove 42 could be formed only on the arm 32, without going outside the scope of the invention.

Each groove 42 opens along the circumferential direction C, namely its bottom 46 is oriented along this direction towards the outside of the unit. Preferably, in a view looking from outside the unit and along direction line 44, as shown in FIG. 5, the groove 42 is approximately semi-circular in shape with its diameter corresponding to the opening of the groove, and the curved part opposite the diameter corresponding to the bottom 46 of the groove. The curved part reference 51 adjacent to the diameter and on the side of the arm 32, forms a stop surface on this connecting arm, therefore the stop surface 51 is approximately parallel to the radial direction B and oriented approximately towards the space 40 between the arms. This stop surface 51 can then be used as a bearing surface for a tool for extracting the unit 24, that can then be forced aftwards along the longitudinal direction to provoke the required extraction. The grooves 42 that enable gripping of the unit 24 will facilitate its extraction after it has been put into position on the ring sectors 16. The special position of these means shifted aftwards on unit 32, makes it easy for them to cooperate with an extraction tool without any risk of adversely affecting the functions performed by this locking unit 24, therefore particularly due to the lack of any direct contact between the tool and the forward end of the arms 28, 30. Consequently, as will be described below, the fact that these grooves 42 are gripped with a tool penetrating into them and bearing on stop surfaces 51 does not create any direct mechanical load on the longitudinal clamping arms 28, 30 and therefore there is no risk that they might be damaged by the tool pressure.

Figure 6A:
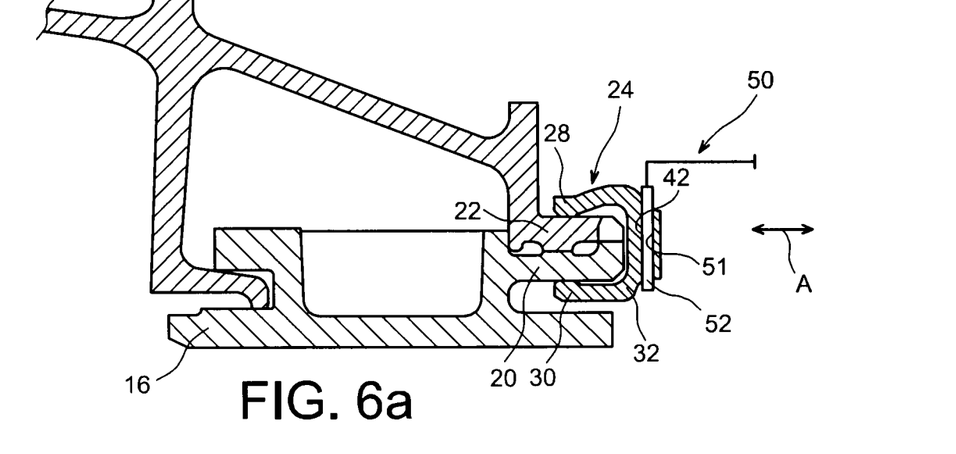
FIGS. 6a to 6c diagrammatically show a method of extracting the locking unit shown in FIGS. 1 to 5.
Figure 6B:
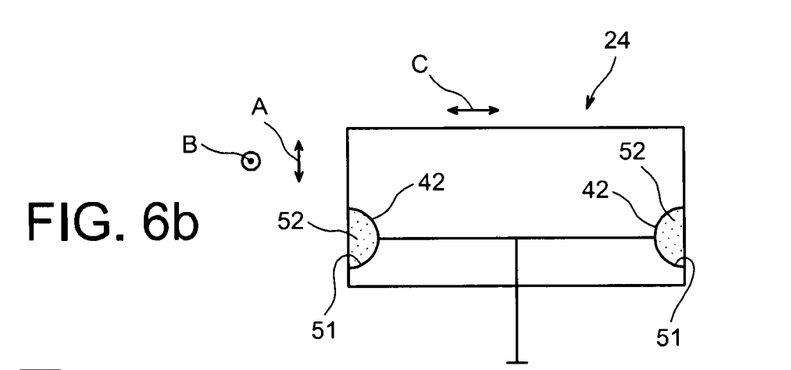
Figure 6C:
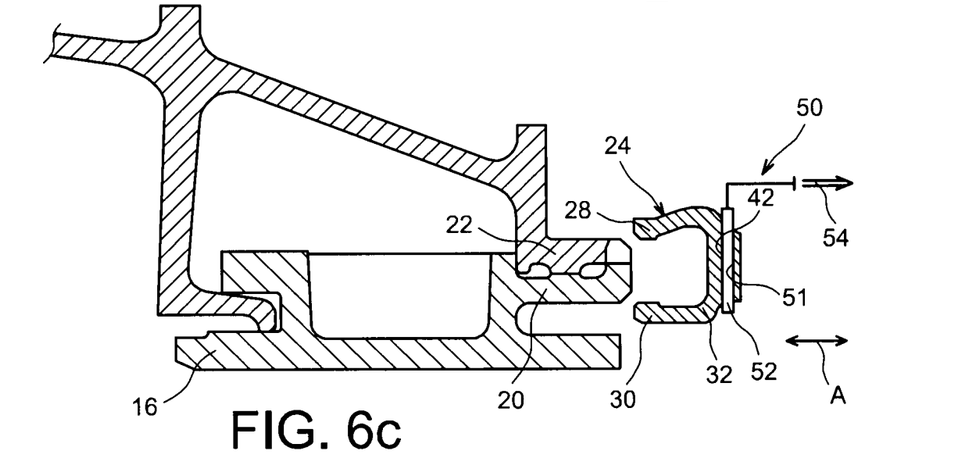

FIGS. 6a and 6c diagrammatically show a method designed to extract a locking unit 24 initially located in its position in which it clamps the ring sectors 16, shown in the previous figures. An appropriate shaped tool is used for this purpose, with a head globally in the shape of a fork with two arms provided with two ends 52, for example in the form of a cylindrical pin complementary to the shape of the grooves 42 in which they will penetrate, as can be seen better in FIG. 6b along the radial direction B.

Each of the two ends 52 is inserted into one of the two grooves 42, for example by moving the tool in the radial direction with the centre line of each pin approximately coincident with the direction line of its associated groove. Therefore to achieve this, the tool 50 needs to move above the unit 24 along direction B, or below it along direction B, due to the through nature of the grooves.

The tool is then moved aftwards manually or automatically along the longitudinal direction A, as shown in FIG. 6c, which has the effect of bringing the pins 52 into contact with their corresponding stop surfaces, if they are not already in contact. The result of continuing this action on tool 50, diagrammatically shown by arrow 54 in FIG. 6c is to progressively move the unit 24 along direction A by sliding the arms 28, 30 aftwards on rims 20, 22, until the unit 24 is completely extracted, thus releasing the associated ring sectors 16.

Figure 7:
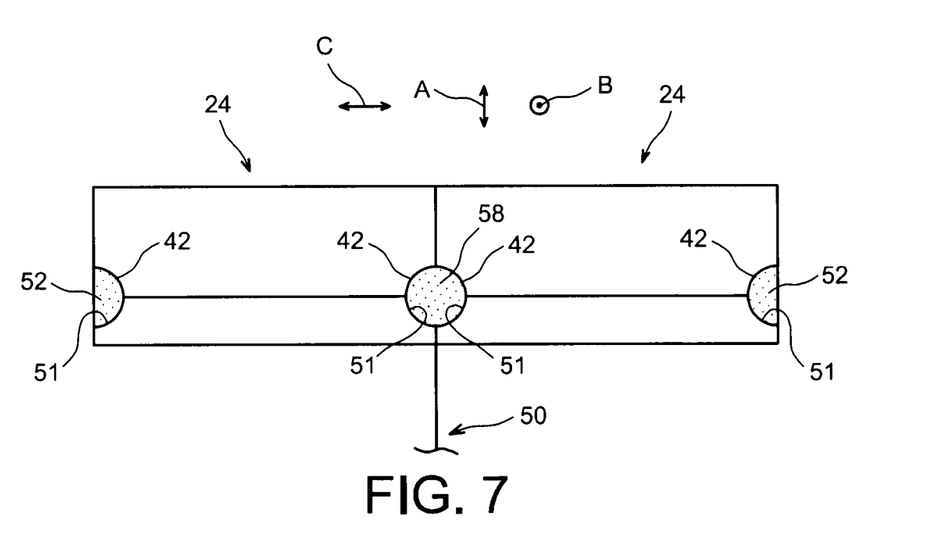
FIG. 7 diagrammatically shows another method designed to simultaneously extract two locking units of the type shown in FIGS. 1 to 5.

FIG. 7 shows another extraction method aimed at simultaneously extracting two units 24 that are directly consecutive along direction C, using a single tool 50. This is done by making this tool 50, shown diagrammatically in FIG. 7, with a fork-shaped head with two arms, each of which is provided with two ends 52, for example in the form of a cylindrical pin complementary to the shape of the grooves 42 in which they are intended to penetrate, namely preferably semi-circular in shape. Furthermore, the tool comprises a third pin 58 that in a top view is in line with the other two pins 52 and that has a shape complementary to the space formed by the two facing grooves 42 into which it is designed to penetrate. This shape is then preferably semi-circular.

Thus, the central pin 58 penetrates simultaneously into the two facing grooves 42, each belonging to one of the two units 24, these two facing grooves jointly forming a housing having an approximately circular section with a shape complementary to the shape of the pin 58. At the same time, each of the two end pins 52 is inserted into the corresponding groove 42 in the corresponding unit 24, namely those at the circumferential ends of the pair of units concerned, for example always by moving the tool in the radial direction. Therefore to achieve this, the tool 50 would be presented above the two units 24 along direction B, or below the units along this direction.

The tool 50 is then forced aftwards along the longitudinal direction A to extract the two units, as shown by the arrow in FIG. 7.

Figure 8:
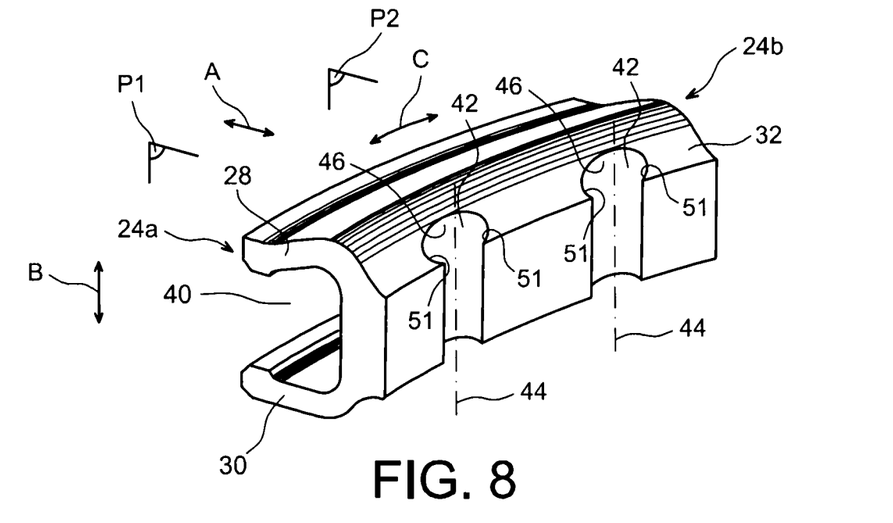
FIGS. 8 and 9 represent views similar to those shown in FIG. 3, the locking device in the two figures being in the form of two alternative embodiments.
Figure 9:
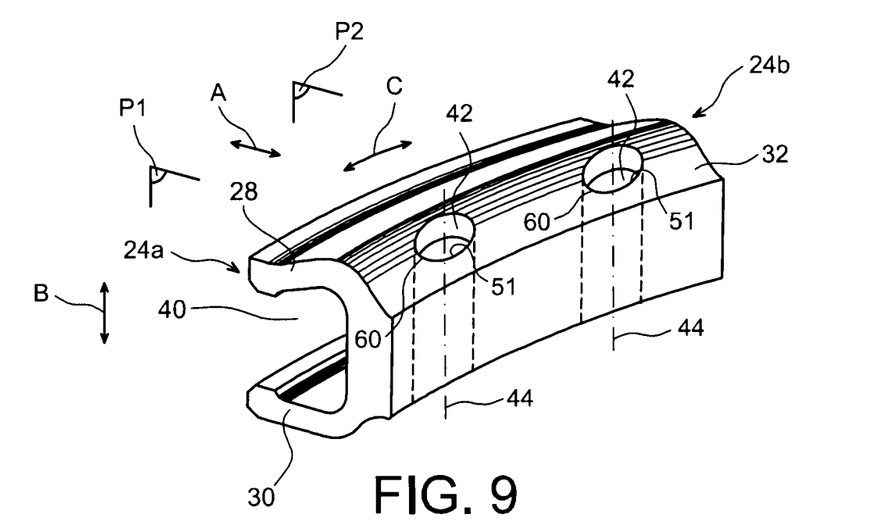

Other designs could be adopted for the locking device according to the invention, like those shown in FIGS. 8 and 9 in which the passages forming gripping means are moved towards the centre, namely moved away from the circumferential ends 24a, 24b but their positions remain on opposite sides of the fictitious median plane P2.

In FIG. 8, each of the two passages is also in the form of a groove 42 extending along a straight approximately radial direction line 44, but opening up radially aftwards and no longer circumferentially as they did in the previous embodiment. Preferably, in a view (not shown) from outside the unit and along direction line 44, the shape of each groove 42 is open and approximately circular, but extends over an angular sector larger than 180° so as to form a stop surface 51 on each side of the groove opening. Therefore each of the two curved stop surfaces 51 is approximately parallel to the radial direction B and approximately facing the space 40 between the arms. Once again, these stop surfaces 51 can act as a bearing surface for an extraction tool of the unit 24 that can then be forced aftwards along the longitudinal direction to provoke the required extraction.

In this embodiment, the bottom of the groove 46 facing aftwards along the longitudinal direction A, may indifferently be provided on the connecting arm 32 along its full length in direction B, or on an aft part of the clamping arms 28, 30 as shown in FIG. 8.

The embodiment shown in FIG. 9 is different from the two previous embodiments in that the two passages for gripping are no longer in the form of grooves, but are more like reamings. In a view (not shown) from outside the unit and along the direction line 44, each passage is bounded by a closed delimitation line 60, for example with a circular or oblong shape. The passages formed are then also formed only on the connecting arm 32 or are staggered on this arm 32 and the two clamping arms 28, 30 as shown in FIG. 9.

The aft part of each passage 42 that preferably extends along the connecting arm along direction B, also forms a stop surface 51 approximately parallel to this radial direction B and approximately oriented towards the space between the arms 40. Once again, these stop surfaces 51 can then be used as a bearing surface for an extraction tool for the unit 24, that can then be forced aftwards along the longitudinal direction to provoke the required extraction.

Obviously, those skilled in the art could make various modifications to the invention that has just been described solely through non-limitative examples.

The invention claimed is:

1. A locking unit for a device configured to attach ring sectors onto an aircraft turbomachine casing, the unit extending along a circumferential direction between a first circumferential end and a second circumferential end, the unit comprising:
   in a cross section of the unit in a plane orthogonal to the circumferential direction, two clamping arms connected to each other at their aft ends by a connecting arm extending between the two clamping arms, forward ends of the two clamping arms configured to squeeze at least one ring sector into contact with at least one casing element, between them; and
   a passage enabling gripping of the unit on each side of a fictitious median plane orthogonal to the circumferential direction, each passage being formed in the connecting arm, extending along a direction line approximately parallel to the direction between the arms, and
   wherein each passage is approximately cylindrical with its axis corresponding to the direction line.

2. A locking unit according to claim 1, wherein each direction line is a straight line.

3. A locking unit according to claim 1, wherein the two passages are arranged on or close to the first circumferential end and the second circumferential end.

4. A locking unit according to claim 1, wherein each passage is a through passage or a blind passage.

5. A locking unit according to claim 1, wherein each direction line extends approximately radially.

6. A locking unit according to claim 1, wherein each passage is in a form of a groove extending along the direction line.

7. A locking unit according to claim 6, wherein each groove is configured to open up in the circumferential direction.

8. A locking unit according to claim 7, wherein each groove is approximately semi-circular in shape when viewed from outside the unit and along the direction line.

9. A locking unit according to claim 6, wherein each groove forms at least one stop surface on the connecting arm, the stop surface being oriented approximately towards a space between the arms of the unit, defined between the clamping arms.

10. A locking unit according to claim 1, wherein each passage has a closed delimitation line in a view taken from outside the unit along the direction line.

11. A locking unit according to claim 10, wherein each delimitation line is generally an oblong or circular line.

12. A locking unit according to claim 1, forming an angular sector of an annular locking device.

13. A device for fixing ring sectors on an aircraft turbomachine casing comprising:
   casing elements formed with first aft circumferential rims on which second aft circumferential rims of the ring sectors are applied; and a plurality of locking units according to claim 1, engaged on the first and second circumferential rims to hold them in contact with each other.

14. A turbine in an aircraft turbomachine comprising a ring sectors attachment device according to claim 13.

15. An aircraft turbomachine comprising a turbine according to claim 14.

16. A turbomachine according to claim 15, which is a turbojet or a turboprop.

\* \* \* \* \*